May 8, 1945.  W. M. BURA  2,375,619
GRINDING MACHINE
Filed April 26, 1941  8 Sheets-Sheet 2
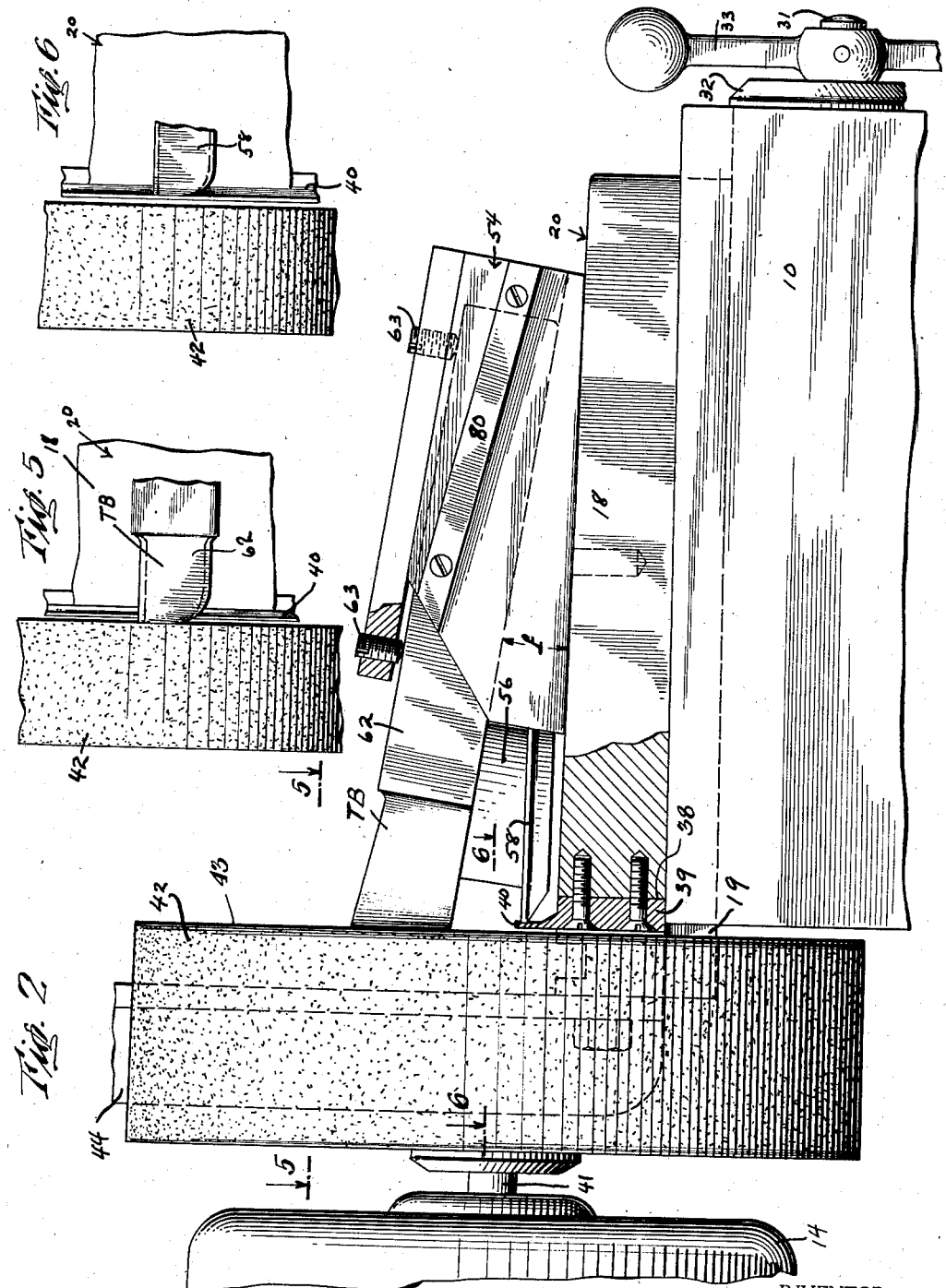
INVENTOR.
Walter Mark Bura
BY
ATTORNEYS May 8, 1945.　　　W. M. BURA　　　2,375,619
GRINDING MACHINE
Filed April 26, 1941　　8 Sheets-Sheet 3
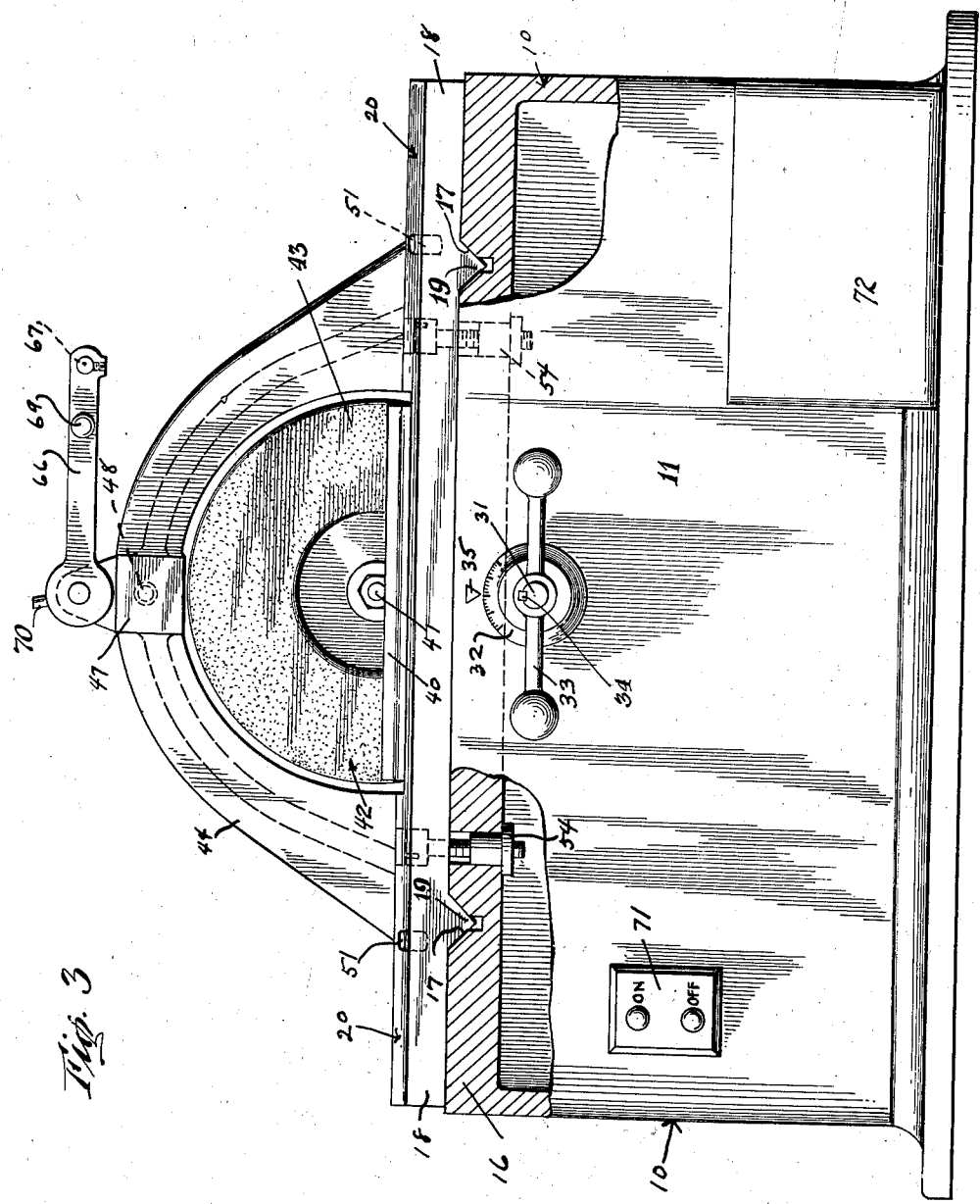
INVENTOR.
Walter Mark Bura May 8, 1945.                    W. M. BURA                        2,375,619
                              GRINDING MACHINE
                           Filed April 26, 1941              8 Sheets-Sheet 4
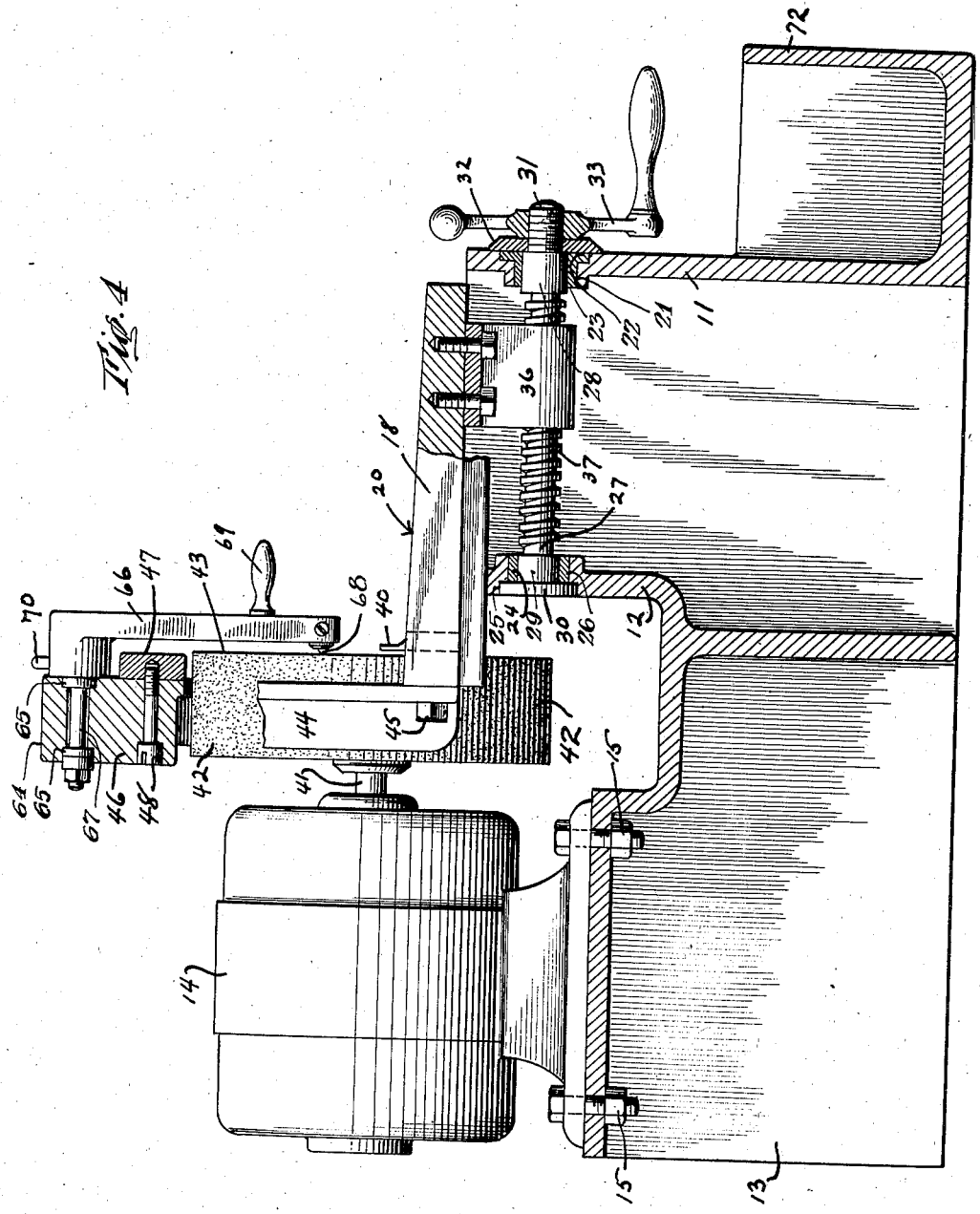
INVENTOR.
Walter Mark Bura
BY
ATTORNEYS May 8, 1945.   W. M. BURA   2,375,619
GRINDING MACHINE
Filed April 26, 1941   8 Sheets-Sheet 5
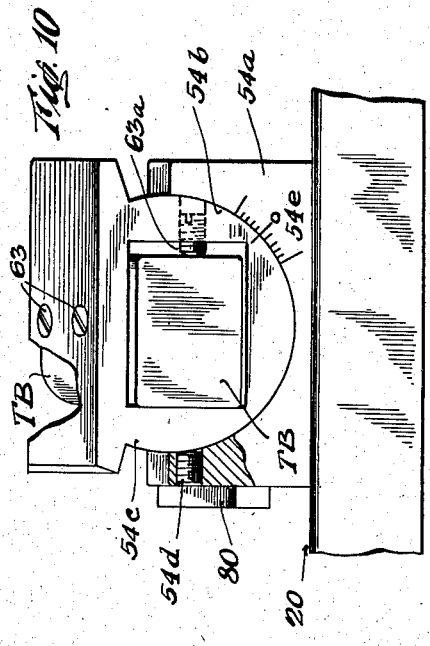
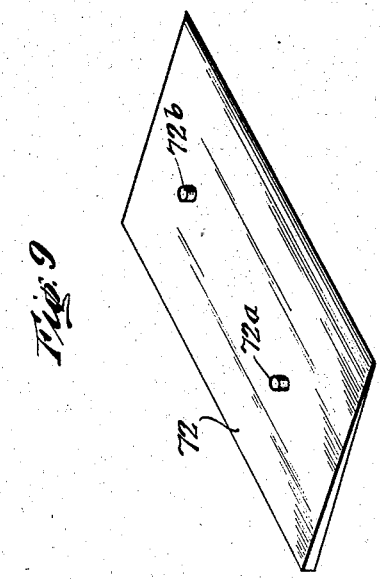
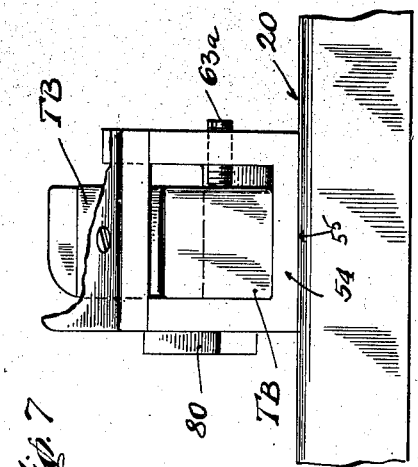
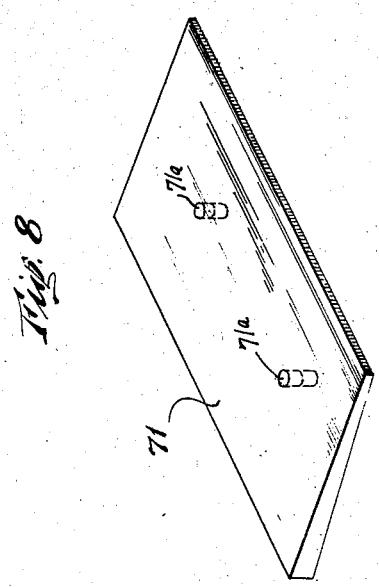
INVENTOR.
Walter Mark Bura
BY
ATTORNEYS May 8, 1945.  W. M. BURA  2,375,619
GRINDING MACHINE
Filed April 26, 1941  8 Sheets-Sheet 6

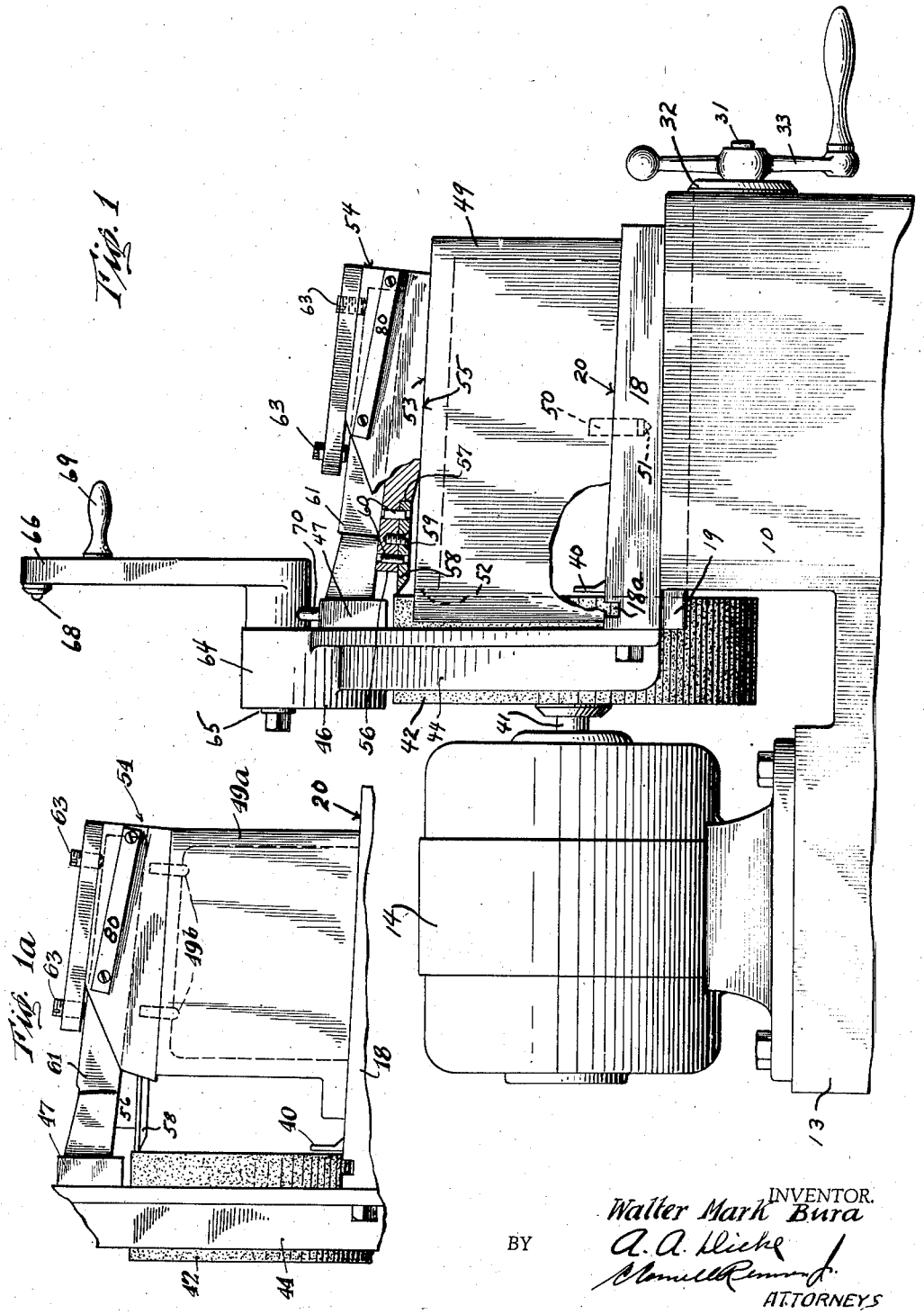

INVENTOR.
Walter Mark Bura
BY
ATTORNEYS

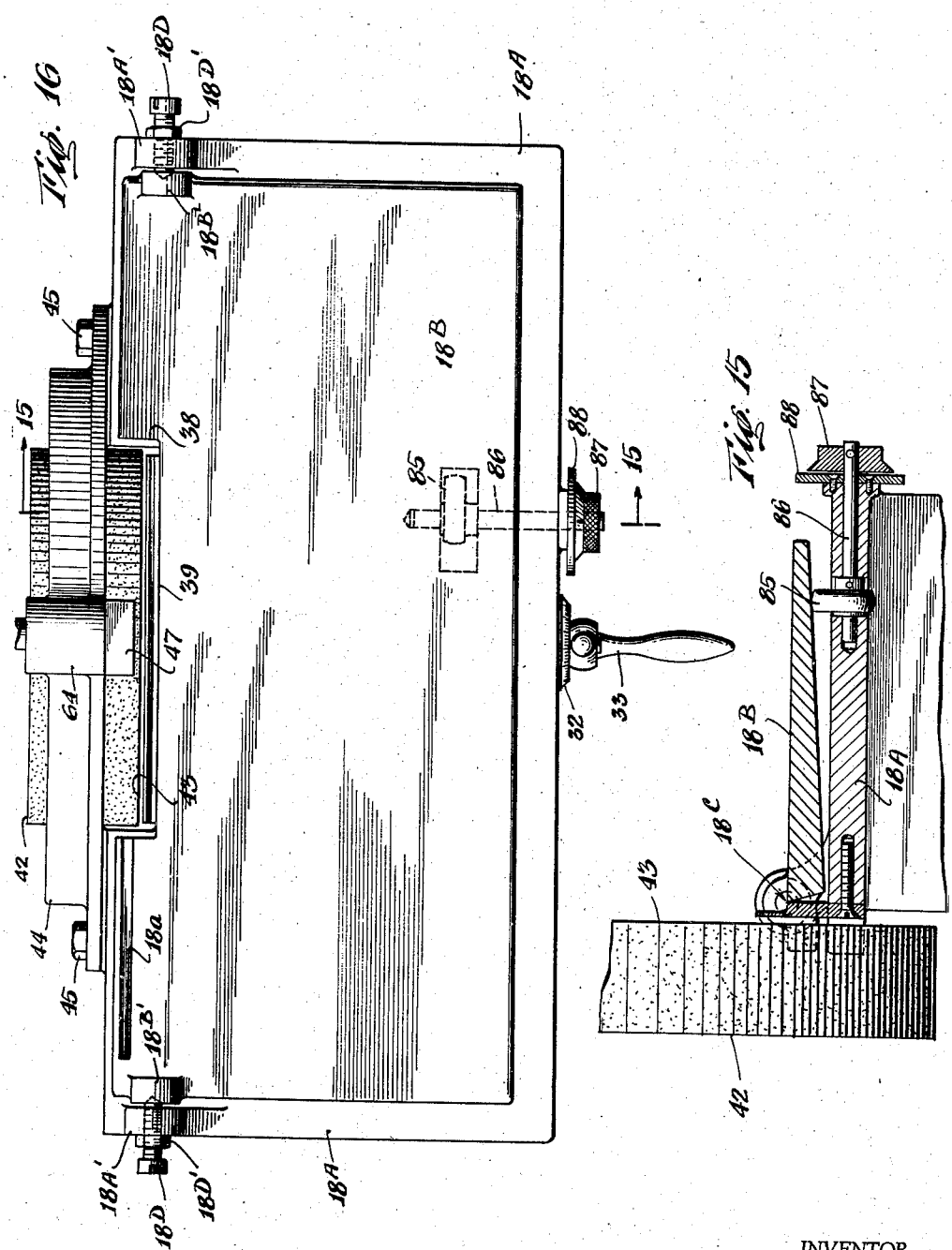

May 8, 1945.  W. M. BURA  2,375,619
GRINDING MACHINE
Filed April 26, 1941   8 Sheets-Sheet 8

INVENTOR.
Walter Mark Bura
BY
ATTORNEYS

Patented May 8, 1945

2,375,619

UNITED STATES PATENT OFFICE 2,375,619

GRINDING MACHINE

Walter Mark Bura, West Orange, N. J., assignor to Norton Company, Worcester, Mass., a corporation of Massachusetts Application April 26, 1941, Serial No. 390,521

21 Claims. (Cl. 51—127)

This invention relates to grinding machines and has for an object the provision of apparatus and method for the precise generation of the form of tools and tool bits and the like for use in machine tools and the geometrically accurate tool bits formed thereby.

This application is a continuation in part of my application Serial Number 386,177, filed March 31, 1941.

In modern machine tool practice cutting tools are required having accurate clearance angles both at the ends and one or both sides thereof which tools in many cases must also be formed with very accurate contours (as viewed for example from above). It is necessary in most cases to provide different angles of clearance at the forward end of the tool from those on the sides, (as viewed in vertical planes normal to the cutting edge at the points in question).

In most instances the corners of the cutting tool are rounded, the radius of curvature of the rounded corner corresponding to the requirements of the particular use to which the tool is to be put, said radius being constant or varying. It will be readily understood that if the angle of clearance at the front of the tool, viz., at the point where the rounding begins, is different from the angle of clearance at the side of the tool, viz., where the rounding ends, it will be necessary to gradually change the angle of clearance (as seen in a vertical cross-section taken along the radius of curvature at the point in question) from one extremity of the rounded corner to the other. No method for forming such a tool has heretofore been known.

It is an object of the present invention to provide a cutting tool and a method and suitable apparatus for forming it in which the angle of clearance (as viewed in vertical planes normal to the cutting edge at the points in question) is gradually changed from one portion of the tool to another.

Another object is to provide a tool, and a method and apparatus for forming it, having at least one rounded corner the form of the corner being such that the clearance angle in a vertical plane generally longitudinal of the tool is substantially identical at all points around said rounded corner.

It is another object to provide a method and apparatus for forming such cutting tools or other work pieces, which may be operated by unskilled workmen in such a way that geometrically accurate cutting tools may be formed.

It is another object of the invention to provide a method and apparatus whereby the contour of a cutting tool on the end and both sides thereof either with or without connecting curves may be accurately formed under the control of a pattern.

It is another object to provide a method and apparatus whereby a tool may be formed in which the clearance or relief angle is gradually changed from one portion of the tool to another while the contour thereof is being formed either with or without the use of a controlling pattern.

Another object is to form a tool having a cylconoid surface as hereinafter defined.

Another object of the invention is to provide a method and apparatus for quickly and accurately forming the controlling pattern.

Another object is to form such a controlling pattern provided with such angles of clearance which that when a tool is subsequently formed under control of said controlling pattern the controlling pattern will bear with line contact on an abutment surface against which it bears.

Another object is to provide means for varying the various clearance or relief angles in accordance with the use to which the tool is to be put.

A further object is to provide such an apparatus including gauging abutment ledges together with means for accurately dressing the grinding wheel so as to form a grinding surface thereon in predetermined accurate relationship to the abutment ledges.

These and other objects and advantages of this invention will be apparent from the following specification and the accompanying drawings of several possible illustrative embodiments of the invention, in which drawings:

Fig. 1 shows a side elevation of one form of apparatus showing the position of the parts while a controlling pattern is being formed;

Fig. 1a is a partial view similar to Fig. 1 but showing a modification;

Fig. 2 is a partial side elevation partly in section showing the machine of Fig. 1 in the act of grinding a tool under the control of a controlling pattern;

Fig. 3 illustrates a front elevation of said illustrative machine partly in section;

Fig. 4 is a side elevation partly in section showing the grinding wheel dresser in position for use;

Fig. 5 is a fragmentary top view of a part of the machine shown in Fig. 2 viewed on the line 5—5 of Fig. 2;

Fig. 6 is a similar section viewed from the line 6—6 of Fig. 2;

Fig. 7 is a rear view of the tool holder shown in Figs. 1 and 2;

Fig. 8 is a perspective of a bevel plate of the type which may be applied to the top of the work table when it is desired to change the effective angle thereof;

Fig. 9 illustrates a bevel plate which may be used under the tool holder of Fig. 7 for the purpose of varying the side clearances to be applied to the tool;

Fig. 10 shows a modified form of tool holder in which the tool may be adjusted around its longitudinal axis to vary the clearance to be applied to the sides of the tool;

Fig. 15 is a partial view mostly in vertical section showing a modification in which the table is pivoted for ready adjustment;

Fig. 16 is a plan view of the machine as it may appear when provided with the pivoted table shown in Fig. 15;

Figure 12:
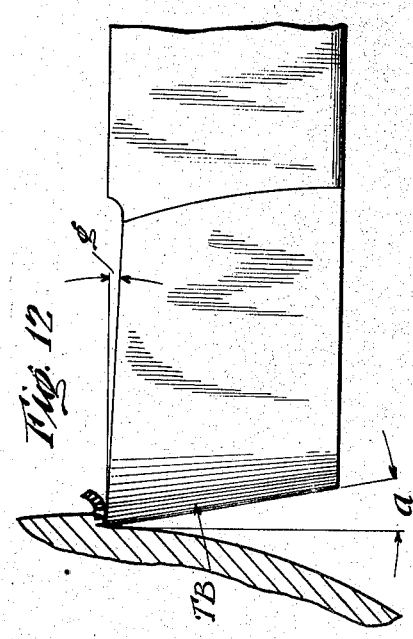
Fig. 12 shows a partial side view of a typical tool bit formed according to the invention.
Figure 14:
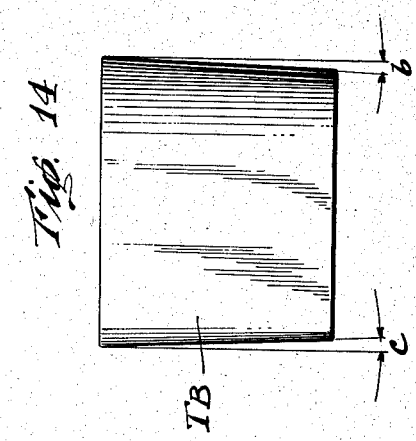
Fig. 14 is a front view thereof.
Figure 13:
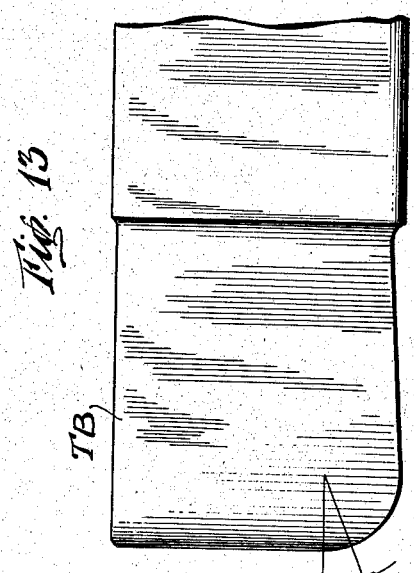
Fig. 13 is a view of the top of such a tool.
Figure 11:
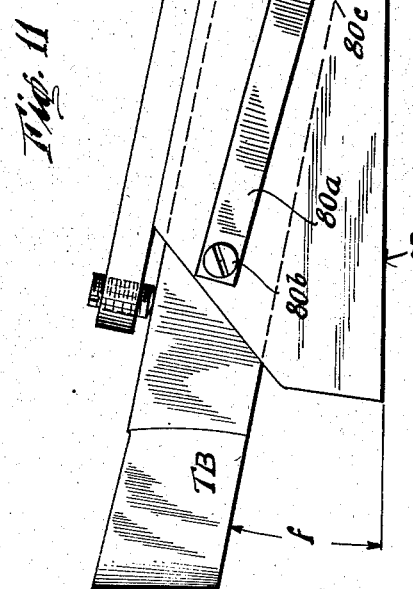
Fig. 11 shows a modified form of the tool holder illustrated in Figs. 1, 2, 7, and 10, means being provided for varying the angle of back rake to be applied to the tool.

Referring to said drawings, the sybol TB indicates a typical tool bit made in accordance with the invention. Referring to Figs. 12, 13, and 14, it will be noted that the front clearance or relief angle is designated by $a$, the left side clearance angle by $b$, the right clearance angle by $c$, and the back rake angle by $g$. The angle of slope of the bottom of the tool relative to the bottom of the tool holder is indicated by $f$ (Figs. 2 and 11). In the form of embodiment selected to illustrate the invention, as shown in the drawings, the numeral 10 designates a base preferably formed hollow, as shown, and having a front wall 11 and an intermediate wall 12 and having a rearward extension 13 upon which is mounted a motor 14 firmly fixed thereon as by bolts 15. The forward portion of the base is shown as provided with a top 16, formed with suitable ways such as guide grooves 17 adjacent each end, these grooves extending from the front of the housing toward its rear. Upon said housing is supported a carriage 18 being slidably mounted relative to the base as by ribs 19 fitting in said grooves 17. The upper face 20 of the carriage or bed plate 18 is usually sloped downwardly from rear to front. In the particular form illustrated, this slope is selected at 1½°. This slope determines the side clearance angle imparted to the tool and contributes to the determination of the end clearance angle as will be explained hereinafter.

Any suitable means may be provided to shift the table 18 forwardly and rearwardly upon the base, viz., with respect to the grinding wheel. In the form illustrated the upper part of the wall 11 is provided with a bore or opening 21 the front end of which is enlarged as at 22 and in this opening is fitted a correspondingly shaped bushing 23. In the upper part of the wall 12 and axially aligned with the bore 21 is a bore 24 having an enlarged rear end 25. In the bore 24 is fitted a bushing 26. A feed screw, indicated in general at 27, is provided at its front end with a journal 28 fitting the bushing 23 and at its rear end with a journal 29 fitting the bushing 26. The rear end of the feed screw has a flange portion 30 which fits the bore portion 25 so that the feed screw is held from forward movement. This feed screw has a reduced and threaded portion 31 projecting forwardly from the journal 29 and upon which projection is mounted a graduated washer or dial indicator 32 which rests against the front face of the wall 11. A crank handle 33 is screwed on the end 31 and bears against the washer 32 which, being of greater diameter than the bore 22, prevents rearward movement of the screw. A key 34 serves to prevent rotation of the parts 32 and 33 on the feed screw after these parts have been assembled and properly adjusted. An index point 35 is scribed on the wall 12 to cooperate with the graduations of the washer 32. Secured to the under side of the forward portion of the carriage 18 is a nut 36 which engages the threaded portion 37 of the feed screw 27. Thus rotation of the crank 33 will cause movement of the carriage in the desired direction on the housing.

The rear edge of the carriage 18 is recessed as at 38 and in the recess is fixed a bar 39 formed with an abutment ledge 40 extending above the face 20.

The motor 14 has a shaft 41 on the front end of which is mounted a material removing device such as a cup-shaped grinding wheel 42 having an annular grinding face 43. This grinding wheel has its forward portion revoluble in the recess 38 so that, by manipulation of the feed screw, the abutment ledge 40 may be adjusted with respect to the grinding face 43. A suitable support such as an arch frame 44 has its ends secured to the carriage 18 at each side of the recess 38 as by bolts 45. This arch frame extends over the wheel 42 and, centrally above the wheel, is provided with a boss 46. A block 47, comprising a controlling pattern grinding block, has its front face accurately formed as a plane surface and is fixed to the boss by screw 48. The front face of this block 47 lies somewhat to the rear of and parallel to the grinding face 43.

When a pattern is to be ground there is removably mounted on the carriage 18 a spacer or step block 49, which is properly positioned when in use by dowels 50 fitting in dowel holes 51 in the carriage 18. This spacer is recessed at 52 to embrace the front upper part of the wheel 42 and its upper face 53 is in the form shown inclined 1½° from the horizontal so as to lie parallel to the face 20 when the spacer is in position. Any other suitable holding means may be used to hold the parts 18 and 49 in properly adjusted relation.

A tool holder is indicated in general at 54 and has an accurately formed plane under surface 55 to rest and slide or turn on either of the surfaces 20 or 53. This box 54 has at its lower forward end an extension 56 which is provided on its under side with a rearwardly opening recess 57. In this recess is mounted a controlling pattern 58 which projects rearwardly of the tool holder and is secured and positioned accurately thereto by the screw 59 and dowels 60. In Fig. 1 there is shown a master form 61 which may represent either a tool which is to be reproduced as will be presently explained, or other suitable master pattern such as a template. The tool holder is arranged in the form shown to hold the bottom face of tools to be ground, or the master tool or master pattern to be followed, at an angle of 8½° to its bottom face. Screws 63 are employed to hold the tool in place.

On the boss 46 is provided a bearing boss 64 having anti-friction bearings 65 at each end of an opening. In these bearings is mounted a shaft 67 on the front end of which is fixed an arm 66 carrying a diamond trueing tool 68. The arm 66 is provided with a handle 69 and on the hub of the arm is fixed a stop pin 70.

It is not deemed necessary to show the circuit connections for the motor but a switch to control this motor may be conveniently located at 71 on the wall 11. At 72 is a well for holding water so that if the noses of the tools get too hot during grinding they may be dipped in the water and cooled off.

In the operation of the invention there is first prepared (see Fig. 1) a master tool or master pattern such as 61. This master is placed in the tool holder 54 and a blank for the controlling pattern 58 of greater longitudinal and lateral dimensions than the nose portion of the master form is fitted in the tool holder. The spacer 49 is next assembled on the carriage 18. The tool holder is now placed on the surface 53 and moved gradually to bring the nose of the master pattern against the block 47 while, at the same time, the controlling pattern engages the grinding face. Prior to grinding, the feed screw is turned to adjust the wheel dresser while the wheel is being dressed which fixes the proper relative position of the front face 43 of the grinding wheel 42 relative to the abutments 40 and 47, after which the screw handle 33 is not touched. The tool holder is then swung laterally from one side to the other while the master form 61 gradually approaches block 47, until finally the nose of the controlling pattern will be ground to exact correspondence with the nose of the master tool or pattern. The step of forming a controlling pattern has then been accomplished.

As shown in Fig. 1a the large spacer box 49 may be dispensed with by providing a foot 49a attached to the bottom of the tool holder 54 as by dowel pins 49b. The bottom of the foot 49a is parallel to the bottom surface of the tool holder 54 and is free to slide upon the surface 20.

To now make a duplicate of the master tool or pattern the master tool or pattern is removed from the tool holder and a work piece such as a tool blank, or a dull tool to be reground 62, is inserted. The spacer 49 is removed and the tool holder placed on the surface 20 and urged towards the grinding face until the controlling pattern 58 engages the abutment ledge 40, the latter being located as far in front of the wheel face as the surface 47 is behind it. The tool holder is now swung from side to side as in forming the controlling pattern, only in this case, the controlling pattern is gradually brought against the abutment ledge 40 during the swinging operation. When the operation is completed the nose of the work piece will exactly duplicate the nose of the master tool or pattern 61 in contour and will have the clearance determined by the slope angle e of the table and the angle of tilt f of the tool.

Obviously, a dull tool will be resharpened in exactly the same manner as in forming a new tool bit from a blank, the dull tool being the equivalent of a blank when thus resharpened but naturally requiring less time for regrinding than the blank.

While the angle of the table is here shown as 1½° application of the bevel plate 71 (Fig. 8) to the surface of the table will enable other side clearance angles to be obtained, it being obvious that as many of these plates of different bevels may be employed as there are tools with different side clearance angles to be ground. Pins 71a project down into holes in the table 18 to hold plate 71 in position.

Since in the form shown the table surface 20 is (the bevel plate 71 not being used) arranged with a slope of 1½°, viz., 1½° to a plane at right angles to the wheel face and as the angle $f$ between the bottom of the tool and the bottom of the tool holder is shown as 8½°, it is obvious that the front clearance given to the tool will be 10° since at this time the tool is held in a vertical plane at right angles to the wheel face. It will also be noted that when the tool holder is swung to grind the sides of the tool, the effect of the angle $f$ will have completely disappeared and the clearance applied to each side will be 1½°. It will also be noted that as the tool holder is gradually swung from its first mentioned position to the positions at which the sides of the tool are ground, the effect of the angle $f$ will gradually change from its maximum of 8½° to zero. Therefore, when the corner of the tool is rounded, as shown in the drawings the clearance angle (as viewed in vertical planes normal to the cutting edge at the points in question) will be gradually changed from 10° when the angle $d$ in Fig. 13 is zero to 1½° when the angle $d$ becomes 90°. The same effect is produced at the right hand corner.

With a tool holder of the form shown in Fig. 7 the side clearances produced will be equal, viz., they correspond with the slope $e$ of the table. In order to provide for a difference in the side clearance angles the use of a bevel plate 72 (Fig. 9) under the tool holder 54 is contemplated. This bevel plate is shown provided with pins 72a and 72b which fit in suitably located holes in the bottom of tool holder 54 to properly locate the bevel plate 72 in relation thereto. Assuming that the angle of plate 72 is 1° and the plate is positioned so as to tilt the tool holder to the right in Fig. 7, it is clear that the clearance angle on the right of the tool will be increased 1°, viz., to 2½°, and that the clearance angle on the left will be decreased 1°, viz., to ½°. In other words, the relationship of the several angles mentioned is $$e = \frac{b+c}{2}$$

If the angle through which the tool holder is tilted equals the angle $e$, zero side clearance will be given at one side and double clearance on the other. The tilt may of course be carried so far as to give a negative clearance on one side, if desired. It will also be noted that $$a = e + f = \frac{b+c}{2} + f$$

and $a_x$ (the clearance angle at any point of a rounded corner) equals $e + f$ cosine $d$ (the clearance being measured in a generally vertical plane normal to the tool contour at the point in question).

Another and most important characteristic of the conformation of the rounded portion of the tool produced by the method and apparatus described is that the clearance angle at any point of a rounded corner when measured in a generally vertical plane longitudinally of the tool is independent of the angle $d$, i. e., is constant. This is the ideal conformation which was never attained heretofore. This conformation is the ideal one because the individual parts of the work approach the tool while moving in vertical planes (in lathes of usual construction) and as the clearance should be neither too great nor too small the ideal desideratum is to hold the clearance in such longitudinal vertical planes constant at all points of the rounded corner or corners. This ideal conformation has for the first time been made possible by the method and apparatus described.

Instead of using detachable bevel plates, such as 72, a form of construction similar to that shown in Fig. 10 may be employed. In this form, the tool holder may consist of a base portion 54a formed with a bore 54b whose axis is inclined at an angle of say 8½° to the bottom surface of the base. Within said bore is located the cylindrical portion 54c of the tool holder proper. The tool is shown as held in place by top screws 63 and side screws 63a. The tool holder proper may be turned within the said bore to the desired angle of adjustment, it being held in place as by means of a set screw 54d. As shown at 54e, suitable graduations may be applied to indicate the extent the tool holder proper has been turned relative to the base.

It will therefore be seen that the sum of the angles of side clearance may be varied by using different bevel plates 71 (or by utilizing the tiltable table form of construction illustrated in Figs. 15 and 16) and that the distribution of the sum of the side clearance angles may be varied by the use of bevel plates such as 72 or the form of tool holder shown in Fig. 10.

If desired, means may also be provided to vary the angle of tilt of the tool TB. This may be done by providing suitable bevel plates under the tool holder 54 or by providing a base therefore for engaging the surface 20 (and 53) said base (not shown) being pivoted to the tool holder 54 near the rear end. In that event suitable graduations would be provided to indicate the angle $f$. In the alternative, a spherical seat might be provided in the base 54a of Fig. 10 to provide for variation of distribution of the side clearance and also for varying the angle $f$.

Means will now be described for grinding the top of the tool bit and applying the proper rake thereto. By reference to Figs. 1 and 16, it will be noted that the carriage 18 is formed with a groove 18a formed in its top surface 20. This groove extends substantially to the grinding wheel. By referring to Figs. 1, 2, 7, and 8, it will be noted that a tongue 80 is formed on or attached to the left side of the tool holder 54. This tongue is adapted to fit in the groove 18a and to permit the sliding of the tool holder back and forth in said groove in such a position as to cause the face of the grinding wheel to grind the top face of the tool and thus apply thereto the proper rake. In the form shown in Fig. 2, the back rake is as shown and the side rake will be 0°. The side rake however can be varied by using the form of tool holder shown in Fig. 10.

In Fig. 11 is illustrated a form of construction by means of which the back rake may be readily varied. In said construction the tool holder may either be of the form shown in Fig. 7 or the one shown in Fig. 10, or other suitable form. The guide tongue 80a instead of being fixed to the tool holder is pivoted to the tool holder at 80b and means are provided such as a screw 80c threaded into a T-block 80d slidably engaged in a circular T-slot 80e. By loosening screw 80c the tongue 80a may be shifted to the desired position and locked in place by turning down screw 80c. Graduations as shown may be provided to facilitate setting. As the groove 18a is parallel to the face of the grinding wheel the top surface of the tool will be formed parallel to the position to which tongue 80a is adjusted to provide either positive or negative top rake of the desired extent. If the adjustable tongue 80a is used on a tool holder of the type shown in Fig. 10, both the back rake and the side rake may be adjusted.

In Figs. 15 and 16 is shown a slightly modified construction. In this form, instead of utilizing bevel plates such as 71 (Fig. 8) in order to vary the angle of the table surface 20 relative to the grinding wheel the table 18B is pivoted relative to its base 18A as at the point 18C. This may be readily done by providing the table base 18A with upstanding bosses 18A' and providing the pivoted table 18B with bosses 18B'. Pivot screws 18D threaded into the bosses 18A' provide a suitable pivot bearing for the table 18B. Lock nuts 18D' are preferably provided to prevent loosening of the pivot screws. Any suitable means may be provided for adjusting the table 18B about its pivots. In the form shown this is accomplished by means of a cam 85 mounted for rotation with a shaft 86 having thereon a preferably graduated adjusting knob 87 arranged in front of a suitable graduation bearing member 88 attached to the table base 18A which also supports the shaft 86. The cam 85 may be an eccentric or may be of spiral form such as an Archimedes spiral. It will be readily seen that as the knob 87 is rotated the front of the table will be lifted and lowered to vary the slope of the table 18B. In the position shown in Fig. 15 the table surface 18B is horizontal, i. e., normal to the wheel face so that the surface ground will be cylindrical.

Figure 17:
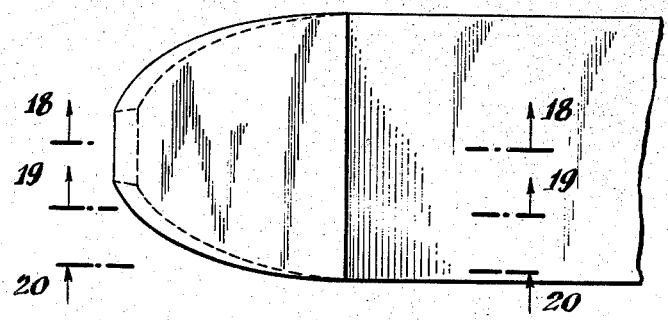
Fig. 17 is a view similar to Fig. 13 of a tool having a somewhat different profile.

The form of tool shown in Fig. 17 is similar to that shown in Figs. 12, 13, and 14, with the exception that only a small part of the front of the tool is flat, the rounded corners therefore comprising a larger part of the tool profile.

Figure 18:
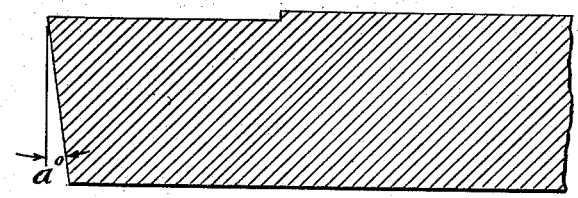
Fig. 18 is a longitudinally vertical cross-sectional view taken along the line 18—18 of Fig. 17.
Figure 19:
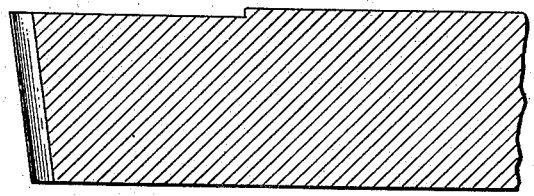
Fig. 19 is a view similar to Fig. 18 taken on the line 19—19 of Fig. 17.
Figure 20:
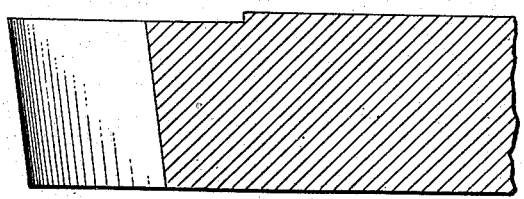
Fig. 20 is a similar view taken on the line 20—20 of Fig. 17.

The cross-sectional views shown in Figs. 18, 19, and 20, show clearly that the clearance angle $a$ measured in generally vertical planes extending longitudinally of the tool is substantially constant at all points of the tool. This angle remains exactly constant when the table is at right angles to the wheel face, as shown in Fig. 15.

The applicant is unable to state the mathematical name of the surface generated by the above described process and apparatus as the mathematicians have apparently not as yet ascribed a name thereto. The surface may be defined as that surface which is generated by moving a straight line (generatrix) along a planar curve (directrix) while maintaining a constant angle between said straight line and a line in the plane of the curve normal to the curve at the instant point of intersection of the generatrix with the directrix. In the specific case where the slope of the tool holder supporting table is zero, the surface generated is a cylinder (although it may be a cylinder of non-circular cross-section as in Fig. 17). Furthermore, in that instance where the table is not at right angles to the wheel face the surface is conical for any part thereof where the contour of the tool (viz. the directrix) is circular. However, in that instance where the plane of the table is not at right angles to the plane of the wheel face and the directrix is a curved line other than circular, no accepted name for the surface is known. The applicant has therefore assigned thereto the name, "cylcone" surface, to the general form of surface generated by the apparatus and method, viz. that surface which is generated by moving a straight line (generatrix) along a planar curve (directrix) while maintaining a constant angle between said generatrix and a line in the plane of the curve normal to the directrix at the instant point of intersection of the generatrix with the directrix.

The tool generated by my apparatus and process has a "cylcone" surface whose directrix plane is at such an angle to the plane of the bottom of the tool that uniform or substantially uniform relief in the direction of tool feed will be provided at all points of the tool contour. Where the tool is an in-feed or plunge-cut tool the angle of the bottom of the tool to the directrix plane is the desired angle of front relief minus the angle of slope of the table, if any. This is effected by the use of the tool holder 54 which causes the front end of the tool to be pointed up with reference to the directrix plane, viz., any plane parallel to the table surface. Likewise, where the tool is a turning tool, the angle of the bottom of the tool to the directrix plane is the desired angle of side relief minus the angle of slope of the table, if any. This may be accomplished by the use of a wedge under the tool holder as shown in Fig. 9 or by properly adjusting the tool holder of Fig. 10. The tool conformation produced is, in the absence of a known name therefor, herein termed a cylconoid conformation.

It will be noted that the constructions shown and described will serve admirably to accomplish the objects stated above. It is to be understood, however, that the constructions disclosed above are intended merely as illustrative of the invention and not as limiting as various other modifications therein may be made without departing from the invention as defined by a proper interpretation of the claims which follow. For example, instead of having the grinding wheel mounted in a fixed position it may be mounted for axial adjustment, in which case the table 18 (or 18A, 18B) would not need to be adjusted axially relative to the grinding wheel. Similarly, the grinding wheel (and the motor 14) may be mounted for pivotal adjustment relative to its base, in which case means for adjusting the slope of the table 18 or 18B would not be necessary. In the latter case, the stop surface 47, the abutment ledge 40, and the wheel dressing means would preferably be tilted with the grinding wheel.

I claim:

1. In a machine for grinding a controlling pattern for grinding cutting tools and for grinding cutting tools in accordance with such pattern, a base, a generally horizontal shaft journaled thereon, a grinding wheel on said shaft for rotation in a generally vertical plane, a tool holder having means for holding a tool with its cutting end tipped upwardly and having means for holding a controlling pattern, a table movable toward and away from said wheel having a plane surface for supporting the tool holder arranged adjacent the wheel and sloping downwardly away from the grinding wheel, an abutment ledge supported for movement with said table, a stop block having a front surface parallel to the front surface of said abutment ledge located above the wheel and also supported for movement with said table, a wheel dressing implement supported for movement with said table so located as to dress the face of the wheel into a plane parallel to the front surfaces of said abutment ledge and of said stop block and midway therebetween, spacer means which may be applied to said table formed with a top plane surface parallel to said table, whereby if a master pattern is placed in the tool holding means of said tool holder and a controlling pattern blank is attached to said tool holder and the spacer means placed upon said table the controlling pattern blank may be ground to the contour determined by said master pattern engaging the stop block and with clearance angles determined by the tilt of the master pattern in the tool holder and the slope of the table as the tool holder is slid about upon the surface of said spacer means, and whereby when the spacer means is removed and a tool blank substituted for the master pattern the tool may be ground to a contour determined by said controlling pattern engaging the abutment ledge and with varying angles of clearance determined by the tilt of the tool in the tool holder and the slope of the table as the tool holder is swung relative to the face of the wheel while sliding about upon the inclined surface of said table with said pattern gradually approaching and then contacting said abutment ledge as the tool is being ground.

2. In a machine for grinding a controlling pattern for grinding cutting tools and for grinding cutting tools in accordance with such pattern, a base, a grinding wheel mounted for rotation, a tool holder, means for constraining movement of said tool holder in a plane inclined at a small angle to a plane perpendicular to the plane of the face of the wheel, said tool holder having means for holding a tool with its cutting end tipped away from said first mentioned plane and having means for holding a controlling pattern, an abutment ledge supported adjacent the face of the wheel, a stop block having a front surface parallel to the front surface of said abutment ledge located outside the wheel periphery, a wheel dressing implement arranged to dress the face of the wheel into a plane parallel to the front surface of said abutment ledge and of said stop block and midway therebetween, whereby if a master pattern is placed in the tool holding means of said tool holder and a controlling pattern blank is attached to said tool holder the controlling pattern blank may be ground to the contour determined by said master pattern engaging the stop block and with clearance angles determined by the tilt of the master pattern in the tool holder and the slope of said first mentioned plane as the tool holder is moved about parallel to said first mentioned plane and whereby when a tool blank is substituted for the master pattern the tool may be ground to a contour determined by said controlling pattern engaging the abutment ledge and with varying angles of clearance determined by the tilt of the tool in the tool holder and the slope of the said plane as the tool holder is moved relative to the face of the wheel parallel to said plane with said pattern gradually approaching and then contacting said abutment ledge as the tool is being ground.

3. In a machine for grinding a controlling pattern for grinding cutting tools and for grinding cutting tools in accordance with such pattern, a base, a generally horizontal shaft journaled thereon, a grinding wheel on said shaft for rotation in a generally vertical plane, a tool holder having means for holding a tool with its cutting end tipped upwardly and having means for holding a controlling pattern, a table movable toward and away from said wheel having a plane surface for supporting the tool holder arranged adjacent the wheel and sloping downwardly away from the grinding wheel, an abutment ledge supported for movement with said table, a stop block having a front surface parallel to the front surface of said abutment ledge located above the wheel and also supported for movement with said table, a wheel dressing implement supported for movement with said table so located as to dress the face of the wheel into a plane parallel to the front surface of said abutment ledge and of said stop block and midway therebetween, tool holder supporting means upon which said tool holder may be placed, so formed that the bottom of the tool holder surface is parallel to said table, whereby if a master pattern is placed in the tool holding means of said tool holder and a controlling pattern blank is attached to said tool holder and the tool holder supporting means placed under said tool holder the controlling pattern blank may be ground to the contour determined by said master pattern engaging the stop block and with clearance angles determined by the tilt of the master pattern in the tool holder and the slope of the table, as the tool holder supporting means is slid about upon the table and whereby when the tool holder supporting means is removed and a tool blank substituted for the master pattern the tool blank may be ground to a contour determined by said controlling pattern engaging the abutment ledge and with varying angles of clearance determined by the tilt of the tool in the tool holder and the slope of the table as the tool holder is swung relative to the face of the wheel while sliding about upon the inclined surface of said table with said pattern gradually approaching and then contacting said abutment ledge as the tool is being ground.

4. In a machine for grinding a controlling pattern for grinding cutting tools and for grinding cutting tools in accordance with such pattern, a base, a generally horizontal shaft journaled thereon, a grinding wheel on said shaft for rotation in a generally vertical plane, a tool holder having means for holding a tool and having means for holding a controlling pattern, a tool holder supporting surface, a support movable toward and away from said wheel having an abutment ledge supported for movement with said support, a stop block having a front surface parallel to the front surface of said ledge located above the wheel and also supported for movement with said support, a wheel dressing implement supported for movement with said support so located as to dress the face of the wheel into a plane parallel to the front surface of said ledge and of said stop block and midway therebetween, whereby if a master pattern is placed in the tool holding means of said tool holder and a controlling pattern blank is attached to said tool holder and the tool holder is moved under control of its supporting surface the controlling pattern blank may be ground to the contour determined by said master pattern engaging the stop block and whereby when a tool blank is substituted for the master pattern the tool blank may be ground to a contour determined by said controlling pattern as the tool holder is moved relative to the wheel under control of its supporting surface with said pattern gradually approaching and then contacting said abutment ledge as the tool is being ground.

5. In a grinding machine, a base, a shaft journaled relative thereto, a grinding wheel on said shaft, a plane surface arranged approximately perpendicular to the plane face of the grinding wheel, a work holder having a bottom adapted to rest upon said surface for sliding and turning thereon in any direction and having means for holding a work piece sloping upwardly and forwardly relative to the bottom of the work holder, said upward and forward end being engageable with the plane face of said grinding wheel, whereby the work piece will be ground to the cylconoid conformation as defined above as the work holder is moved and turned relative to the plane of the face of the wheel while supported on said surface with the said end of said work piece engaging the said plane face of said wheel.

6. In a grinding machine, a base, a substantially horizontal shaft journaled relative thereto, a grinding wheel having a plane face mounted on said shaft, a table having a plane surface sloping downwardly away from a horizontal plane parallel to the wheel axis, a work holder having a bottom adapted to rest upon said surface for sliding and turning thereon in any direction and having means for holding a work piece sloping upwardly and forwardly relative to the bottom of the work holder, said upward and forward end being engageable with the plane face of said grinding wheel, whereby the work piece will be ground to the cylconoid conformation as defined above as the work holder is moved and turned relative to the plane of the face of the wheel while supported on said sloping surface with the said end of said work piece engaging the said plane face of said wheel, the front clearance angle being the sum of the angle of slope of the table surface and the upward slope of the work piece in the work holder and the side clearance on each side being equal to the angle of slope of the table surface.

7. In a grinding machine, a base, a substantially horizontal shaft journaled relative thereto, a grinding wheel on said shaft, a table having a surface sloping downwardly away from said wheel, a work holder having a bottom adapted to rest upon said surface for sliding and turning thereon in any direction and having means for holding a work piece sloping upwardly and forwardly relative to the bottom of the work holder said upward and forward end being engageable with the plane face of said grinding wheel, said work holder having means for adjusting the work piece rotatably about its longitudinal axis to either side of normal position, whereby the work piece will be ground to the cylconoid conformation as defined above as the work holder is slid and swung relative to the plane of the face of the wheel while supported on said sloping surface with the said upward aand forward end of said work piece engaging the said plane face of said wheel, the front clearance angle being the sum of the angle of slope of the table surface and the upward slope of the work piece in the work holder, the said side clearance angles differing by twice the angle the tool is turned from normal and the sum of the angles of clearance on the sides being twice the angle of slope of the table surface.

8. In a machine for grinding cutting tools, a base, a generally horizontal shaft journaled thereon, a grinding wheel on said shaft for rotation in a generally vertical plane, a tool holder for holding the tool, a table having a plane surface for supporting the tool holder arranged adjacent the wheel so that the tool may be ground as the tool holder is swung relative to the face of the wheel while sliding about upon the surface of said table with its end engaging the plane face of the grinding wheel, one side of said tool holder being formed with a guide surface and the table being formed with a cooperating guide surface parallel to the plane face of the wheel so that when the tool holder is laid upon the table with said side down and with said guide surfaces interengaging, the top face of said tool may be accurately ground by engagement with the plane face of the wheel while the tool holder slides parallel to the wheel face under control of said guide surfaces.

9. In a machine for grinding cutting tools, a base, a generally horizontal shaft journaled thereon, a grinding wheel on said shaft for rotation in a generally vertical plane, a tool holder for holding the tool, a table having a plane surface for supporting the tool holder arranged adjacent the wheel so that the profile of the tool may be ground as the tool holder is swung relative to the face of the wheel while sliding about upon the surface of said table with the end of the tool engaging the plane face of the grinding wheel, one side of said tool holder being formed with a pivotally adjustable guide member and the table being formed with a cooperating guide member parallel to the face of the wheel so that when the tool holder is laid upon the table with said side down and with said guide members interengaging, the top face of said tool may be accurately ground against the plane face of the wheel, the angle of top rake being dependent upon the pivotal adjustment of said first mentioned guide member.

10. The method of grinding cutting tools which comprises the steps of so placing a tool in a tool holder having a plane bottom that its forward end is further from the plane of the bottom of the tool holder than is its other end, placing the tool holder on a supporting surface adjacent a plane grinding surface and moving said tool holder with its bottom sliding upon said surface while grinding the said forward end of the tool and at least one side thereof upon said plane grinding surface, whereby the cutting tool is ground to the cylconoid conformation as defined above.

11. A grinding machine according to claim 6 in which means are provided for varying the slope of said plane supporting surface.

12. A grinding machine according to claim 6 in which the supporting table is pivoted about an axis near the wheel and means are provided for holding the table in various positions of pivotal adjustment.

13. In a machine for grinding cutting tools, a base, a generally horizontal shaft journaled thereon, a grinding wheel on said shaft for rotation in a generally vertical plane, a table having a plane surface for supporting the tool holder arranged adjacent the wheel and sloping downwardly away from a horizontal plane parallel to the axis of the grinding wheel and normal to the plane face of the grinding wheel, a tool holder having a plane bottom for sliding upon said plane surface and having means for holding the tool with its front end further away from the bottom of the tool holder than its other end, a controlling pattern attached to said tool holder and an abutment ledge supported relative to said table, whereby the tool may be ground to a contour determined by said pattern and to the cylconoid conformation as defined above as the tool holder is swung relative to the face of the wheel while sliding about upon the inclined surface of said table with said pattern gradually approaching and then contacting said abutment as the tool is being ground.

14. In a machine for grinding cutting tools, a base, a shaft journaled relative thereto, a grinding wheel having a plane grinding surface on said shaft, a table having a surface arranged at a small angle to a horizontal plane normal to said wheel face, a tool holder having a bottom adapted to slide upon said surface and having means for holding a tool with its cutting end tilted at a small angle relative to the bottom of the tool holder and into engagement with the plane face of said wheel, whereby the tool may be ground to the cylconoid conformation as defined above as the tool holder is swung relative to the plane of the face of the wheel while sliding upon said table surface, the front clearance angle being the sum of the angle of slope of the table surface relative to the horizontal and the tilt of the tool in the tool holder and the side clearance on each side being equal to the angle of slope of the table surface.

15. In a machine for grinding cutting tools, a base, a generally horizontal shaft journaled thereon, a grinding wheel having a plane grinding surface on said shaft for rotation in a generally vertical plane, a tool holder for holding the tool with its longitudinal axis tilted at a small angle relative to the bottom of the tool holder and having its front end in engagement with the plane face of said wheel, a table having a plane surface for supporting the tool holder arranged adjacent the wheel and arranged at a small angle to a horizontal plane normal to the grinding wheel face, a controlling pattern attached to said tool holder and an abutment ledge supported relative to said table, whereby the tool may be ground to a contour determined by said pattern and to the cylconoid conformation as defined above as the tool holder is swung relative to the face of the wheel while sliding about upon the inclined surface of said table with said pattern gradually approaching and then contacting said abutment as the tool is being ground.

16. That method of grinding cutting tools which comprises the steps of placing a tool in a tool holder with its longitudinal axis tilted relative to the bottom of the tool holder, placing the tool holder on a supporting surface arranged at an angle differing slightly from ninety degrees to a plane grinding surface and swinging the tool holder from side to side while sliding upon said supporting surface with the end of the tilted tool pressed against said plane grinding surface whereby the cutting tool is ground to the cylconoid conformation as defined above.

17. In a grinding device of the type wherein a grinding machine is provided with a grinding wheel having a plane grinding face and with a supporting surface disposed at an angle differing slightly from 90° to the plane of the face of the wheel, the combination therewith of a tool holder having a bottom adapted to rest upon said supporting surface and having means for holding a tool with its longitudinal axis at an angle to the bottom of the tool holder, whereby, when the tool holder is moved about upon such a supporting surface with the tool engaging the plane face of the grinding wheel, the tool will be ground to the cylconoid conformation as defined above as the tool holder is swung relative to the plane of the face of the wheel while supported on said surface, the angle of side clearance being the angle by which the supporting surface departs from 90° to the wheel plane and the angle of front clearance being the angle of side clearance plus the angle of tilt of the longitudinal axis of the tool relative to the bottom of the tool holder.

18. In a tool grinding device of the type wherein a grinding machine is provided with a grinding wheel and with a supporting surface movable toward and away from said wheel disposed at an angle differing slightly from 90° to the plane of the face of the wheel and said supporting surface has a groove in its face adjacent the grinding wheel and parallel to the face of said wheel, the combination therewith of a tool holder having a bottom adapted to rest upon said supporting surface and having means for holding a tool at an angle to the bottom of the tool holder and having a tongue extending from one of its sides adapted to fit in said groove, whereby, when the tool holder is moved about upon such a supporting surface with the tool engaging the plane face of the grinding wheel, the tool will be ground to the cylconoid conformation as defined above as the tool holder is swung relative to the plane of the face of the wheel while supported on said surface, the angle of side clearance being the angle by which the supporting surface departs from 90° to the wheel plane and the angle of front clearance being the angle of side clearance plus the angle of tilt of the tool relative to the bottom of the tool holder, and whereby, when the tool holder is laid on its side with its tongue engaged in the groove in the table the top of said tool may be ground parallel to said tongue to an extent determined by the adjustment of the table toward said wheel face.

19. In a device for grinding the profile and the top rake on cutting tools, a grinding machine having a grinding wheel and a supporting table movable toward and away from said wheel in a direction substantially parallel to the axis of said wheel, said table being formed with a groove adjacent the grinding wheel and parallel to the face of the wheel, the combination therewith of a tool holder having means for holding a tool having a base resting upon said table surface while grinding the profile of said tools and having a tongue extending from at least one of its sides adapted to fit in said groove, whereby, when the tool holder is laid on its side with its tongue engaged in said groove with the top of the tool facing the plane face of the grinding wheel, the top surface of the tool may be ground parallel to said tongue to an extent determined by the adjustment of the table toward said wheel face.

20. A device according to claim 19 in which the tongue is pivoted relative to the tool holder so that the angle of top rake ground on the tool may be varied.

21. In a machine for grinding cutting tools, a rotatable grinding wheel having a plane face in a vertical plane, a table adjacent the plane face of said wheel having a horizontal surface, a tool holder having a bottom adapted to rest upon said table and having means for slopingly holding a tool with its cutting end farther from the bottom of the tool holder than its other end and with its cutting end engageable with the plane face of said grinding wheel, whereby the tool will be ground to a cylindrical conformation as the tool holder is swung relative to the plane of the face of the wheel while supported on said table surface with the tool engaging the said plane face of said wheel, and the front clearance viewed in generally vertical planes generally longitudinal of the tool is constant at all points at the front end of said tool.

WALTER MARK BURA.